United States Patent [19]

Kubo et al.

[11] Patent Number: 5,077,146
[45] Date of Patent: Dec. 31, 1991

[54] MAGNETIC RECORDING MEDIUM CONTAINING A SUBSTITUTED HEXAGONAL FERRITE MAGNETIC POWDER WHICH INCLUDES ZR OR HF AND WHICH HAS A TEMPERATURE COEFFICIENT OF COERCIVITY NOT MORE THAN 3.5 OERSTEDS/°C.

[75] Inventors: Osamu Kubo; Tutomu Nomura, both of Yokohama; Tadashi Ido, Ebina; Hirotaka Yokoyama, Yokosuka, all of Japan

[73] Assignee: Kabushiki Kaisha Toshiba, Kanagawa, Japan

[21] Appl. No.: 250,576

[22] Filed: Sep. 29, 1988

[30] Foreign Application Priority Data

Sep. 30, 1987 [JP] Japan ................. 62-247526

[51] Int. Cl.$^5$ ............................. G11B 23/00
[52] U.S. Cl. .......................... 428/694; 428/900; 252/62.59
[58] Field of Search ............. 428/694, 900; 252/62.59

[56] References Cited

U.S. PATENT DOCUMENTS

| | | | |
|---|---|---|---|
| 3,046,227 | 7/1962 | Gorter et al. | 252/62.5 |
| 4,341,648 | 7/1982 | Kubo et al. | 252/62.63 |
| 4,543,198 | 9/1985 | Kamiyama | 252/62.59 |
| 4,606,971 | 8/1986 | Ido et al. | 428/328 |
| 4,636,433 | 1/1987 | Kubo et al. | 428/328 |
| 4,770,933 | 9/1988 | Kitahata et al. | 428/323 |
| 4,778,734 | 10/1988 | Ohdan et al. | 428/694 |
| 4,810,402 | 3/1989 | Mair | 252/62.58 |
| 4,886,714 | 12/1989 | Torii et al. | 428/694 |

OTHER PUBLICATIONS

Kojima, H. et al., "Magnetic Properties of Substituted $BaFe_{12}O_{19}$", Jul. 1970, Ferrites: Proceedings of the International Conf., Japan, pp. 380-382.

M. Kishimoto et al., "Temperature Dependence of Anisotropy Field in Co-Ti Substituted Ba-Ferrite Particles", IEEE Transactions on Magnetics, vol. 25, No. 3, Sep. 1989, pp. 4063-4065.

Primary Examiner—Paul J. Thibodeau
Assistant Examiner—Stevan A. Resan
Attorney, Agent, or Firm—Finnegan, Henderson, Farabow, Garrett, and Dunner

[57] ABSTRACT

Disclosed is a magnetic powder for high-density magnetic recording, formed of a substituted hexagonal ferrite possessing an average particle diameter in the range of 0.01 to 0.2 μm and a coercivity in the range of 200 to 2,000 Oe and characterized by the fact that the substituted hexagonal ferrite has at least 0.05 to 0.5 atom of at least one element selected from the group consisting of Zr and Hf per chemical formula and at least one element selected from among the elements other than Zr and Hf substituted for part of the Fe atom of the ferrite, and a magnetic recording medium of the present invention comprises a substrate and the magnetic powder mentioned above deposited on the substrate. Since the magnetic powder comprises very minute particles, the magnetic powder and the magnetic recording medium are capable of high-density recording. The magnetic powder has an improved desirably controlled aspect ratio for orientation and the temperature characteristic of coercivity (Hc) as compared with the countertype formed of a hexagonal ferrite which has neither Zr nor Hf substituted for the Fe atom.

4 Claims, No Drawings

MAGNETIC RECORDING MEDIUM CONTAINING A SUBSTITUTED HEXAGONAL FERRITE MAGNETIC POWDER WHICH INCLUDES ZR OR HF AND WHICH HAS A TEMPERATURE COEFFICIENT OF COERCIVITY NOT MORE THAN 3.5 OERSTEDS/°C.

The present application claims priority of Japanese Patent Application No. 62-247526 filed on September 30, 1987.

FIELD OF THE INVENTION AND RELATED ART STATEMENT

The present invention relates to a magnetic powder for use in high-density recording and to a magnetic medium using the magnetic powder.

The coating type magnetic recording medium is composed of a non-magnetic substrate such as of polyethylene terephthalate and a magnetic layer made chiefly of a magnetic powder and a resinous binder and deposited on the substrate.

As a magnetic powder for the magnetic recording, the needle-shaped magnetic particles such as of $\gamma$-$Fe_2O_3$, $CrO_2$, and Co-$\gamma$-$Fe_2O_3$ have been widely used heretofore. Recently, the desirability of a magnetic recording medium which is capable of vertical magnetic recording has enjoyed growing recognition by those seeking to attain a marked improvement in magnetic recording density. As a promising candidate, a magnetic recording medium using a microfine magnetic powder of hexagonal ferrite has been studied and consequently found to be capable of high-density recording.

A magnetic powder for high-density magnetic recording produced by substituting a divalent Co ion and a tetravalent element selected from the group consisting of Ti and Ge or a pentavalent element selected from the group consisting of V, Nb, Sb, and Ta for part of the Fe atoms of a hexagonal ferrite has been known to the art (U.S. Pat. No. 4,341,648).

In the above-mentioned hexagonal ferrite, the aspect ratio (particle diameter/thickness) of the particle is desired to be as large as possible for increasing an orientation. However, if the aspect ratio is too large, it causes the decrease of the bulk density of the medium and the decrease of saturation magnetization of the magnetic powder. Therefore, it is preferable that the aspect ratio is in the range of 3.5 to 5.0.

In the case of the magnetic recording medium using the aforementioned magnetic powder of hexagonal ferrite, like any other magnetic recording medium, the magnetic properties thereof are required to be stable to withstand changes of temperature. If the properties are heavily varied by temperature, the recording and reproducing properties to be manifested in the magnetic recording medium are heavily varied as a consequence of changes in the working ambient temperature. This fact constitutes itself an obstacle to the practical utility of the medium. However, the magnetic recording medium using the hexagonal ferrite exhibits a temperature characteristic such that even if the neighborhood of normal room temperature, the magnitude of coercivity (Hc) increases with the rising temperature. In the circumstances, the desirability of developing a hexagonal ferrite excelling in thermal stability has been finding recognition from the practical point of view.

The inventors, with a view to alleviating the harsh true state of affairs of the prior art described above, continued a diligent study in search of a method for controlling the plate ratio in the desirable range and for improving the thermal stability of coercivity (Hc) of the hexagonal ferrite. As a result, it has been determined that the dependency of the coercivity upon temperature is notably decreased and the aspect ratio is desirably increased by substituting a stated amount of Zr or Hf and other element for valency adjustment for part of Fe as a component element.

OBJECT AND SUMMARY OF THE INVENTION

The first object of the present invention, therefore, is to provide a magnetic powder for high-density magnetic recording, which is composed of a hexagonal ferrite possessing an improved temperature characteristic.

The second object of the present invention is provide a magnetic recording medium using the magnetic powder composed of a hexagonal ferrite possessing an improved temperature characteristic.

The other objects of the present invention will become apparent from the following description of the invention.

The magnetic powder of the present invention for high-density magnetic recording is formed of a substituted hexagonal ferrite possessing an average particle diameter in the range of 0.01 to 0.2 $\mu$m and a coercivity in the range of 200 to 2,000 Oe and is characterized by the fact that the substituted hexagonal ferrite has at least 0.05 to 0.5 atom of at least one element selected from the group consisting of Zr and Hf per chemical formula and at least one element selected from among the elements other than Zr and Hf substituted for part of the Fe atom of the ferrite. The magnetic recording medium using the magnetic powder mentioned above is characterized by having the magnetic powder deposited on a substrate.

As examples of the hexagonal ferrite to be used in the present invention, the M type (magnetoplumbite type) and W type uniaxially anisotropic hexagonal Ba ferrites, Sr ferrites, Pb ferrites, Ca ferrites, Ba ferrites partially substituted with Sr, Pb, or Ca, and uniaxially anisotropic ferrites and ionic substitutes of the aforementioned ferrites may be mentioned.

The uniaxially anisotropic hexagonal ferrite crystals of the present invention possess a specific average particle diameter falling in the range of 0.02 to 0.2 $\mu$m. If the average particle diameter of the hexagonal ferrite crystals is less than 0.02 $\mu$m, the magnetization and the coercivity are not sufficient and the reproducing output of the magnetic recording medium is unduly low. Conversely, if the particle diameter exceeds 0.2 $\mu$m, the coercivity is insufficient and the reproducing operation of the magnetic recording medium emits heavy noise during the course of high-density recording.

The uniaxially anisotropic hexagonal ferrite crystals of the present invention possess a specific coercivity falling in the range of 200 to 2,000 Oe. If the coercivity of the hexagonal ferrite crystals is less than 200 Oe, the signals recorded on the recording medium are not retained sufficiently. Conversely, if this coercivity exceeds 2,000 Oe, the recording and reproducing head made of a ferrite, Sendust, or an amorphous alloy permits signals to be recorded or erased only with difficulty.

As a way of causing the coercivity of the uniaxially anisotropic hexagonal ferrite crystals of the present invention to fall in the range of 200 to 2,000 Oe, the present invention adopts the method consists in substituting a divalent to hexavalent metal shown below for part of the Fe as a component element of the ferrite. As substituting elements, a combination of a divalent and a tetravalent element, particularly the combination of Co and Ti, and the combination with Co-Nb, is used particularly advantageously.

| Divalent | Co, Ni and Zn |
| --- | --- |
| Trivalent | Mn and In |
| Tetravalent | Ti, Sn, and Ge |
| Pentavalent | V, Nb, Sb, and Ta |
| Hexavalent | Cr, Mo, and W |

Since these elements are substitutes for the trivalent Fe. The particular elements to be selected from among those cited above and used in a combination, therefore, must be such that the average valency of the combination conforms to the valency, 3, of the Fe atom subjected to the substitution. Though the total amount of these substituting elements per chemical formula is variable with the particular combination of a divalent and a tetravalent to hexavalent metallic elements, it is desirably in the range of 0.2 to 1.2 atoms per chemical formula.

In the present invention, the hexagonal ferrite has at least 0.05 to 0.5 atom of at least one element selected from the group consisting of Zr and Hf substituted for the Fe atom of the ferrite.

The substituted hexagonal ferrite of the present invention can be represented by the following formula;

$$AFe_{12-x-y}Ma_xMb_yO_{19}$$

(wherein A stands for at least one element selected from the group consisting of Ba, Sr, Pb, and Ca, Ma stands for the combination of at least one element selected from the group consisting of Co, Zn, Ni, In, Mn, Ti, Sn, Ge, V, Nb, Sb, Ta, Cr, Mo, and W, Mb stands for at least one element selected from Zr and Hf, and x and y stand for values falling in the range following ranges; $0.2 \leq x \leq 1.2$ and $0.05 \leq y \leq 0.5$).

In the magnetic powder of the present invention, the proper amount of the substituting element selected from the group consisting of Zr and Hf to be used for substitution is defined to fall in the range of 0.05 to 0.5 atom of the element per chemical formula. This particular range has been selected because the temperature dependency of the aspect ratio and the coercivity (Hc) is not sufficiently improved if the amount is less than 0.05 and the saturated magnetization of the magnetic powder is heavily declined and the magnetic recording medium using this magnetic powder is incapable of acquiring a satisfactory output characteristic if the amount exceeds 0.5.

Since Zr and Hf are tetravalent elements, the Fe atom of the hexagonal ferrite cannot be substituted solely by these element. Thus, at least one element selected from the group of Zr and Hf must be combination with the other substituting element in proportions so adjusted that the average valency of the combination of the elements becomes 3.

As preferred examples of the substituted hexagonal ferrite of the present invention, substituted hexagonal ferrite represented by the following formulas may be cited.

$$AFe_{12-2x}Co_xTi_{x-y}M_yO_{19} \text{ and}$$

$$AFe_{12-2x}Co_xTi_{x-y}M_yO_{19} \text{ and}$$

$$AFe_{\{12-(\frac{3}{2}x+\frac{1}{2}y)\}}Co_xNb_{\frac{x-y}{2}}M_yO_{19}$$

(wherein A stands for at least one element selected from the group consisting of Ba, Sr, Pb, and Ca, M stands for at least one element selected from the group consisting of Zr and Hf, and x and y stand for values falling in the following ranges; $0.2 \leq x \leq 1.2$ and $0.05 \leq y \leq 0.5$).

The magnetic powder of the present invention is produced, for example, by the glass crystallization method which comprises melting oxides or carbonates of the elements essential for the formation of the hexagonal ferrite in combination with such a glass-forming substance as boric acid, sudden cooling the resultant molten mass thereby forming glass, heat-treating the glass at a prescribed temperature thereby inducing precipitation of a crystalline powder of hexagonal ferrite, and finally removing the various component from the crystalline powder by a heat treatment. The coprecipitation-falling method, the hydrothermal method, etc. are available for the production of the magnetic powder.

Among other methods mentioned above, however, the glass crystallization method proves to be particularly advantageous for the purpose of the present invention in view of the characteristic of the magnetic powder to be produced.

The magnetic powder of hexagonal ferrite of the present invention is generally applied in combination with a resinous binder on the surface of a substrate formed of a plastic film such as a polyester (typified by polyethylene terephthalate) film or a metallic sheet such as an aluminum foil, to give rise to a magnetic recording medium.

As concrete examples of the resinous binder which forms a magnetic layer in combination with the microfine magnetic powder, vinyl chloride-vinyl acetate copolymer, vinylidene chloride type copolymer, acrylic ester type copolymers, polyvinyl butyral type resins, polyurethane type resins, cellulose derivatives, epoxy resins, and varying combinations thereof may be mentioned.

In the magnetic layer, such additives as dispersant, lubricant, abradant, and antistatic agent may be suitably incorporated, as occasion demands, in addition to the magnetic powder and the resinous binder.

Since the magnetic powder of the present invention for high-density magnetic recording is defined to possess an average particle diameter in the range of 0.02 to 0.2 μm, the magnetic recording medium using this magnetic powder acquires an ample reproducing output and emits only slight noise while the medium is in the process of reproducing operation.

Further, since the magnetic powder is allowed to acquire a coercivity in the range of 200 to 2,000 Oe by substituting elements such as Co-Ti other than Zr and Hf for part of the Fe atom of the component elements, the magnetic recording medium permits ample preservation of recorded signals and allows signals to be recorded and erased by the conventional head.

The hexagonal ferrite of which the magnetic powder is formed has at least 0.05 to 0.5 atom of at least one element selected from the group consisting of Zr and Hf per chemical formula and at least one element selected from the elements other than Zr and Hf substituted for part of the Fe atom of the ferrite. The magnetic powder has desirably increased aspect ratio of the particle, an increased effect of medium output in the vertical orientation and a decreased temperature dependency of the coercivity thereof and the magnetic recording medium is enabled to effect stable recording and reproducing without reference to possible changes in the ambient temperature.

DETAILED DESCRIPTION OF PREFERRED EMBODIMENT

Now, the present invention will be described below with reference to working examples.

EXAMPLES 1 to 6

Magnetic powders of Ba ferrite of the following formulas:

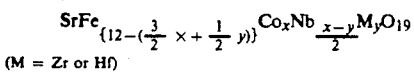
(M = Zr or Hf)

 (M = Zr or Hf)

wherein x was fixed at 0.85 and the amount, y, of the element M was varied in the range of 0.05 to 0.50, were prepared by the glass crystallization method as follows:

First, a $B_2O_3$ BaO glass or $B_2O_3SrO$ glass and $Fe_2O_3$, CoO, $TiO_2$ or $Nb_2O_5$, and $ZrO_2$ (or $HfO_2$) weight out in relative amounts such as to give rise to the ferrite composition mentioned above were simultaneously mixed and melted at 1,350° C. The resultant melt is rolled and suddenly cooled to form a glass containing the aforementioned components.

Then this glass was heated at 800° C. for four hours to induce precipitation in the matrix of a Ba ferrite substituted with Fe, Co, Ti and Zr (or Hf) and a Sr ferrite substituted with Fe, Co, Nb and Zr (or Hf). Finally, the glass was washed with acetic acid to obtain a magnetic powder of Ba ferrite or Sr ferrite. The magnetic powder was formed of minute particles possessing particle diameters in the neighborhood of 0.1 μm.

A magnetic coating material of the following composition (expressed in parts by weight) was prepared using each of the three lots of Ba ferrite powder.

| | |
|---|---|
| Ba ferrite particles | 100 parts |
| Vinyl chloride-vinyl acetate copolymer | 10 parts |

| -continued | |
|---|---|
| Polyurethane | 10 parts |
| Aluminum oxide | 2 parts |
| Lubricant | 1.5 parts |
| Dispersant (lecithin) | 2 parts |
| Methylethyl ketone | 70 parts |
| Toluen | 70 parts |
| Cyclohexanone | 40 parts |
| Curing agent | 5 parts |

The three species of coating material consequently obtained were each applied on a polyethylene terephthalate film 15 μm in thickness. The coated film was subjected to be provided a vertical orientation in the magnetic field of 5 kOe, to a drying in the magnetic field, to a calendering treatment and a slitting treatment, to prepare a magnetic tape having a magnetic layer 3.5 μm in thickness.

The aspect ratio of the magnetic powder thus obtained and the magnetic tapes using the obtained magnetic powder were tested for coercivity (Hc) and saturation magnetization (σ) at normal room temperature and for temperature variation, ΔHc/ΔT, of coercivity (Hc) and the reproducing output level of the medium in a temperature range of 20 to 100° C.

The results are shown in the following table.

The comparative examples indicated in the table produced magnetic tapes by following the procedure of the working examples, excepting the amount, y, indicated in the aforementioned general formula was fixed at 0 and at 0.60, a value falling outside the range contemplated by the present invention. They are offered for comparison with the working examples of the present invention.

TABLE

| | Substitution Elements | Amount of Co X | Amount of M Y | Coercivity Hc (Oe) | Aspect ratio of Particle (D/t) | Temperature Coefficient of Coercivity ΔHc/ΔT(Oe/°C.) | Squareness ratio (perpendicular direction) | Saturation Magnetization Ms(emu/cc) | Output of Medium dB λ = 0.5 μm |
|---|---|---|---|---|---|---|---|---|---|
| Example | | | | | | | | | |
| 1 | Co—Nb—Zr | 0.85 | 0.05 | 760 | 3.5 | 3.5 | 0.76 | 120 | +0.8 |
| 2 | | 0.85 | 0.10 | 730 | 4.4 | 3.2 | 0.80 | 120 | +0.8 |
| 3 | | 0.85 | 0.50 | 700 | 4.8 | 0.6 | 0.84 | 118 | +1.0 |
| 4 | Co—Nb—Hf | 0.85 | 0.05 | 700 | 3.6 | 3.5 | 0.77 | 122 | +0.9 |
| 5 | | 0.85 | 0.10 | 650 | 4.5 | 3.0 | 0.80 | 119 | +0.9 |
| 6 | | 0.85 | 0.50 | 620 | 5.0 | 0.5 | 0.85 | 115 | +1.0 |
| Comparative Experiments | | | | | | | | | |
| 1 | Co—Nb—Zr | 0.85 | — | 790 | 3.0 | 4.0 | 0.55 | 120 | 0.0 |
| 2 | | 0.85 | 0.60 | 660 | 5.8 | −0.7 | 0.87 | 99 | −1.3 |
| 3 | Co—Nb—Hf | 0.85 | — | 790 | 3.0 | 4.0 | 0.56 | 125 | 0.0 |
| 4 | | 0.85 | 0.60 | 580 | 5.9 | −0.5 | 0.88 | 95 | −1.5 |

*Corrected by 4 πMs

What is claimed is:

1. A magnetic recording medium, characterized by having deposited on the surface of a substrate a magnetic powder for high-density magnetic recording, formed of a substituted hexagonal ferrite possessing an average particle diameter in the range of 0.01 to 0.2 μm and a coercivity in the range of 200 to 2,000 Oe and characterized by the fact that said substituted hexagonal ferrite has a temperature coefficient of coercivity of not more than 3.5 Oe/° C. in the range from 20° C. to 100° C. and is represented by the formulas:

$AFe_{12-2x}Co_xTi_{x-y}M_yO_{19}$ and $$AFe_{\{12-(\frac{3}{2}x+\frac{1}{2}y)\}}Co_xNb_{\frac{x-y}{2}}M_yO_{19}$$

wherein A stands for at least one element selected from the group consisting of Ba, Sr, Pb and Ca, M stands for at least one element selected from the group consisting of Zr and Hf, and X and y stand for values falling in the following ranges: $0.2 \leq x \leq 1.2$ and $0.05 \leq y \leq 0.5$.

2. The magnetic recording medium of claim 1, wherein said magnetic powder is applied in combination with a resinous binder on the surface of said substrate.

3. The magnetic recording medium of claim 1, wherein said magnetic powder has been produced by the glass crystallization method.

4. The magnetic recording medium of claim 2, wherein said magnetic powder has been produced by the glass crystallization method.

* * * * *